US011863506B2

(12) United States Patent
Shin et al.

(10) Patent No.: US 11,863,506 B2
(45) Date of Patent: Jan. 2, 2024

(54) MESSENGER-LINKED SERVICE SYSTEM AND METHOD USING A SOCIAL GRAPH OF A MESSENGER PLATFORM

(71) Applicant: LINE Corporation, Tokyo (JP)

(72) Inventors: JungHo Shin, Seongnam-si (KR); Jungmin Lee, Seongnam-si (KR)

(73) Assignee: LINE Corporation, Tokyo (JP)

( * ) Notice: Subject to any disclaimer, the term of this patent is extended or adjusted under 35 U.S.C. 154(b) by 0 days.

(21) Appl. No.: 17/837,210

(22) Filed: Jun. 10, 2022

(65) Prior Publication Data

US 2022/0303235 A1     Sep. 22, 2022

Related U.S. Application Data

(63) Continuation of application No. 15/334,730, filed on Oct. 26, 2016, now Pat. No. 11,388,119, which is a
(Continued)

(30) Foreign Application Priority Data

Jun. 12, 2012   (KR) .................. 10-2012-0062882

(51) Int. Cl.
*G06F 15/16*    (2006.01)
*H04L 51/046*   (2022.01)
(Continued)

(52) U.S. Cl.
CPC .......... *H04L 51/046* (2013.01); *H04L 51/214* (2022.05); *H04L 51/52* (2022.05); *H04L 67/535* (2022.05); *H04W 4/21* (2018.02)

(58) Field of Classification Search
CPC ..... H04L 51/046; H04L 51/52; H04L 51/214; H04L 67/535; H04W 4/21
(Continued)

(56) References Cited

U.S. PATENT DOCUMENTS 7,828,661 B1   11/2010 Fish et al.
8,543,637 B2    9/2013 Kent, Jr. et al.
(Continued)

FOREIGN PATENT DOCUMENTS

EP           1475734 A2 * 11/2004  ........... G06Q 10/107
JP        2003-337716 A    11/2003
(Continued)

OTHER PUBLICATIONS

JP Office Action for corresponding Japanese Patent Application No. 2021-032587 dated May 31, 2022 and English machine translation thereof.
(Continued)

*Primary Examiner* — Anthony Mejia
(74) *Attorney, Agent, or Firm* — Harness, Dickey & Pierce, P.L.C.

(57) ABSTRACT

A messenger-linked service system and method using a social graph based on a human relationship of a messenger are provided. The messenger-linked service system may include a relationship extraction unit to extract a social graph of a friend relationship of the messenger, a selection unit to select data in the messenger-linked service, and an execution unit to either transmit or to execute a sharing request of the selected data to the friend using the social graph.

20 Claims, 10 Drawing Sheets

Related U.S. Application Data continuation of application No. 13/730,137, filed on Dec. 28, 2012, now abandoned.

(51) Int. Cl.
  *H04L 51/52* (2022.01)
  *H04L 51/214* (2022.01)
  *H04W 4/21* (2018.01)
  *H04L 67/50* (2022.01)

(58) Field of Classification Search
  USPC ......................................................... 709/206
  See application file for complete search history.

(56) References Cited

U.S. PATENT DOCUMENTS

| | | | |
|---|---|---|---|
| 9,020,965 B1 | 4/2015 | Sehrer | |
| 9,891,963 B2* | 2/2018 | Parker | H04L 69/24 |
| 2002/0086732 A1 | 7/2002 | Kirmse et al. | |
| 2003/0212746 A1* | 11/2003 | Fitzpatrick | H04L 12/1827 715/752 |
| 2004/0225637 A1* | 11/2004 | Heinzel | G06Q 10/107 |
| 2005/0086309 A1 | 4/2005 | Galli et al. | |
| 2006/0112268 A1 | 5/2006 | Kamiya et al. | |
| 2006/0271696 A1 | 11/2006 | Chen et al. | |
| 2007/0130275 A1 | 6/2007 | Maresh | |
| 2007/0248070 A1 | 10/2007 | Choi | |
| 2008/0013701 A1* | 1/2008 | Barhydt | H04L 51/58 379/92.02 |
| 2008/0071868 A1 | 3/2008 | Arenburg et al. | |
| 2008/0167937 A1* | 7/2008 | Coughlin | G06Q 10/1093 705/7.19 |
| 2009/0043848 A1 | 2/2009 | Kordun | |
| 2009/0181767 A1 | 7/2009 | Feng | |
| 2009/0240564 A1* | 9/2009 | Boerries | G06Q 30/02 709/204 |
| 2009/0299963 A1* | 12/2009 | Pippuri | H04M 1/2746 |
| 2009/0327882 A1 | 12/2009 | Velusamy | |
| 2010/0017406 A1 | 1/2010 | Yamamoto | |
| 2010/0076831 A1* | 3/2010 | Samuel | G06Q 30/02 709/204 |
| 2010/0100845 A1* | 4/2010 | Khan | G06F 16/9535 715/810 |
| 2010/0161720 A1* | 6/2010 | Colligan | H04W 4/02 711/E12.002 |
| 2011/0028137 A1* | 2/2011 | Moshrefi | G06Q 30/02 455/418 |
| 2011/0077084 A1 | 3/2011 | Wormald et al. | |
| 2011/0167122 A1 | 7/2011 | Groves et al. | |
| 2011/0213785 A1 | 9/2011 | Kristiansson et al. | |
| 2011/0282942 A1* | 11/2011 | Berger | G06Q 50/01 235/494 |
| 2012/0095998 A1 | 4/2012 | Sheehan et al. | |
| 2012/0143974 A1 | 6/2012 | Zhang et al. | |
| 2012/0179765 A1* | 7/2012 | White | G06Q 10/107 709/206 |
| 2012/0220277 A1* | 8/2012 | Gonynor | G06Q 30/02 455/414.2 |
| 2013/0007143 A1* | 1/2013 | Rinard | G06Q 10/107 709/206 |
| 2013/0103447 A1 | 4/2013 | Melander et al. | |
| 2013/0110947 A1* | 5/2013 | Boukadakis | H04L 67/535 709/206 |
| 2013/0159096 A1* | 6/2013 | Santhanagopal | G06Q 30/0269 705/14.49 |

FOREIGN PATENT DOCUMENTS

| | | | | |
|---|---|---|---|---|
| JP | 2004-355245 A | 12/2004 | | |
| JP | 2007-140975 A | 6/2007 | | |
| JP | 2007-287131 A | 11/2007 | | |
| JP | 2008-059305 A | 3/2008 | | |
| JP | 2008-140326 A | 6/2008 | | |
| JP | 2010-053840 A | 3/2010 | | |
| JP | 2010-067076 A | 3/2010 | | |
| JP | 2011-164913 A | 8/2011 | | |
| WO | WO-2004021205 A2 * | 3/2004 | ........... | H04L 12/581 |
| WO | WO-2008/041357 A1 | 4/2008 | | |

OTHER PUBLICATIONS

Line camera, You can enjoy photo decoration with stamps using popular LINE characters (English machine translation attached). URL:https://isuta jp/category/iphone/2012/05/184976/, 2012.
Line Card, A unique character unique to Line is now available as a greeting card! You can enjoy even more heartfelt communication (English machine translation attached). URL:https://isuta jp/category/iphone/2012/04/179053/,2012.
Japanese Office Action dated Nov. 5, 2013.
Japanese Office Action dated Feb. 4, 2014.
Japanese Office Action dated Jun. 11, 2013.
Reaction, introduction an online software to make a broadband more comfortable! Net tools of fascination, PC Japan Article 11, Issue 3, Japan, Softbank Creative Inc., Mar. 1, 2006, No. 11, pp. 120-123.
Korean Office Action dated Jul. 9, 2014.
Japanese Office Action dated Mar. 19, 2019 for corresponding Japanese Application No. 2018-047533.
Japanese Office Action dated Jun. 14, 2019 for corresponding Japanese Application No. 2019-100732.
Japanese Office Action dated Jun. 14, 2019 for corresponding Japanese Application No. 2019-100733.
Machine English Translation of Japanese office Action dated Aug. 5, 2019 for corresponding Japanese Application No. 2019-100732.
Machine English Translation of Japanese Office Action dated Aug. 5, 2019 for corresponding Japanese Application No. 2019-132485.
Machine English Translation of Japanese Office Action dated Aug. 5, 2019 for corresponding Japanese Application No. 2019-100733.

* cited by examiner

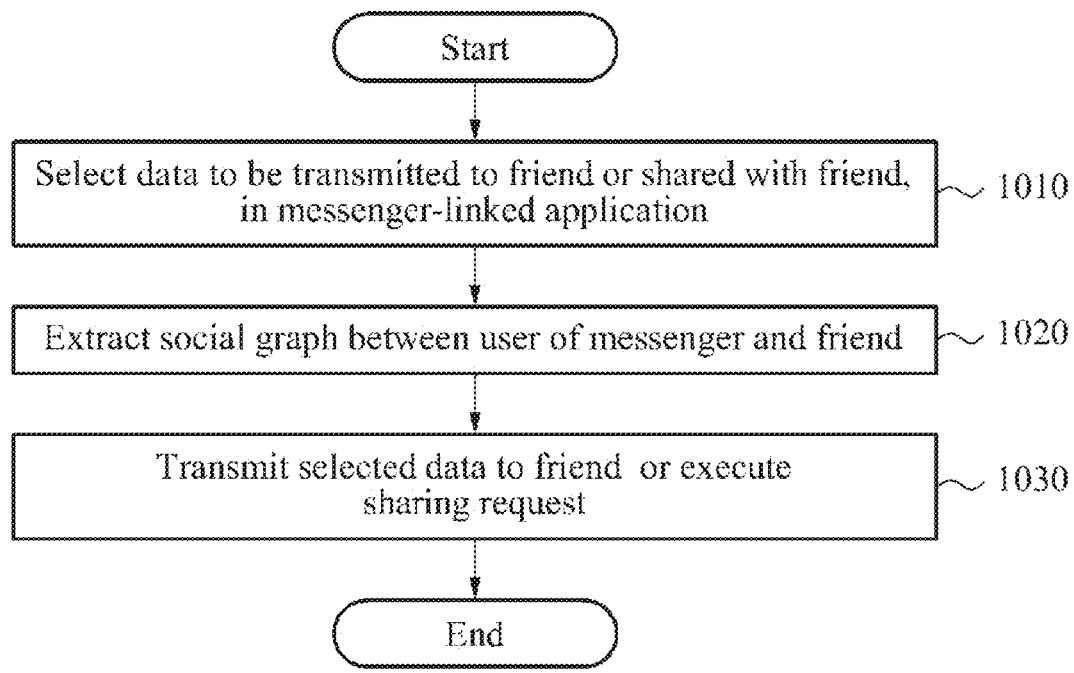

MESSENGER-LINKED SERVICE SYSTEM AND METHOD USING A SOCIAL GRAPH OF A MESSENGER PLATFORM

CROSS-REFERENCE TO RELATED APPLICATION

This application is a continuation of U.S. patent application Ser. No. 15/334,730, filed on Oct. 26, 2016, which is a continuation of U.S. patent application Ser. No. 13/730,137, filed on Dec. 28, 2012, which claims the benefit of priority under 35 U.S.C. § 119 to Korean Patent Application No. 10-2012-0062882, filed on Jun. 12, 2012, in the Korean Intellectual Property Office (KIPO), the entire contents of each of which are hereby incorporated by reference in their entireties.

BACKGROUND OF THE INVENTION

Field of the Invention

Exemplary embodiments of the present invention relate to a messenger-linked service system and method using a human relationship social graph of a messenger platform.

Discussion of the Background

Existing computer-based messengers are linked to smart devices, and a large number of messenger applications for smart devices are gradually being developed. Messenger applications are used in meetings between friends or fellow workers, however, messenger applications are restricted to share data stored in smart devices or data associated with various applications, other than a text.

Current messenger-linked services enable transmission of photos, video, contacts, or audio files stored in smart devices. Additionally, in current messenger-linked services, a friend list of a messenger is linked to a Social Network Service (SNS), and friends in the friend list are recommended as SNS friends. Services enabling interworking of data information between a messenger and an SNS are provided, however, these services have restrictive data sharing services. In addition, as users need to manually recommend a friend list to be linked to a friend, they experience inconveniences.

SUMMARY OF THE INVENTION

According to exemplary embodiments of the present invention, a variety of data may be transmitted and shared using a relationship of a platform of a messenger. For example, a friend relationship may permit a more convenient delivery of data exchange services to a user.

Exemplary embodiments of the present invention provide a messenger-linked service system and method to enable data associated with a messenger-linked application to be transmitted and shared through a messenger. The data can include, for example, a card application, a camera application, a schedule application, and the like. The exemplary embodiments complement existing services that enable photos, video, audio files, and the like stored in a smart device to be transmitted through a messenger or text messages.

Exemplary embodiments of the present invention also provide a messenger-linked service system and method that may enable a user to use convenient services by automatically calling a friend relationship, a group relationship, or a chat room that is to be transmitted or shared.

Additional features of the invention will be set forth in the description which follows, and in part will be apparent from the description, or may be learned by practice of the invention.

Exemplary embodiments of the present invention disclose a messenger-linked service system including: a processor; a relationship extraction unit configured to extract, using the processor, a social graph of a friend relationship of a messenger; a selection unit configured to select data in a messenger-linked service; and an execution unit configured to either transmit or execute a sharing request of the selected data to the friend using the social graph.

Exemplary embodiments of the present invention disclose a messenger-linked service system executable by an application corresponding to a messenger-linked service, the messenger-linked service system including: a processor; a selection unit configured to select data in the messenger-linked service; a relationship extraction unit configured to extract, using the processor, a social graph between a user of a messenger and a friend; and an execution unit configured to either transmit or execute a sharing request of the selected data to the friend using the social graph.

Exemplary embodiments of the present invention disclose a method that uses a processor to perform a messenger-linked service, the method including: extracting, using the processor, a social graph between a user of a messenger and a friend; selecting data in a messenger-linked service; and either transmitting or executing a sharing request of the selected data to the friend using the social graph.

Exemplary embodiments of the present invention disclose a method that uses a processor and a messenger-linked application to perform a messenger-linked service, the method including: selecting, using the processor, data in the messenger-linked service; extracting a social graph between a user of a messenger and a friend after performing a user authentication between a messenger and messenger-linked service; and either transmitting or executing a sharing request of the selected data to the friend, using the social graph.

Exemplary embodiments of the present invention disclose a transitory computer-readable storage media having stored thereon a computer program that, when executed by one or more processors, causes the one or more processors to perform acts that provide a message-linked service, the acts including: extracting, using the processor, a social graph between a user of a messenger and a friend; selecting data in a messenger-linked application; and either transmitting or executing a sharing request of the selected data to the friend using the social graph.

Exemplary embodiments of the present invention disclose a method that uses a processor to provide a linked service, the method including: providing a chat service, using the processor, with a friend of a user through a messenger, the friend being registered in the messenger; performing a user authentication between a messenger-linked service and the messenger; and registering a social graph of the friend in the messenger-linked service, through the user authentication.

Exemplary embodiments of the present invention disclose a method that uses a processor to provide a linked-service, the method including: providing a chat service, using the processor, with a friend of a user through a messenger, the friend being registered in the messenger; performing a user authentication between a messenger-linked service and the messenger; registering a social graph of the friend in the messenger-linked service, through the user authentication; and sharing data associated with the messenger-linked service with the friend, using the social graph.

Exemplary embodiments of the present invention disclose a method that uses a processor to provide a linked-service, the method including: providing a chat service, using the processor, with a friend of a user through a messenger, the friend being registered in the messenger; operating the messenger in a messenger-linked service; selecting, by the user, at least one target among the friend and a group, the group being registered in the messenger; and sharing data associated with the messenger-linked service with the selected target.

Exemplary embodiments of the present invention disclose a system for providing a linked-service, the system including: a processor; a chat service configured to provide a chat service, using the processor, with a friend of a user through a messenger, the friend being registered in the messenger; an authentication unit configured to perform a user authentication between a messenger-linked service and the messenger; and a relationship registrar configured to register a social graph of the friend in the messenger-linked service, after the user authentication.

Exemplary embodiments of the present invention disclose a system for providing a linked-service, the system including: a processor; a chat service configured to provide a chat service, using the processor, with a friend of a user through a messenger, the friend being registered in the messenger; an authentication unit to perform a user authentication between a messenger-linked service and the messenger; a relationship registrar configured to register a social graph of the friend in the messenger-linked service, after the user authentication; and a data sharer configured to share data associated with the messenger-linked service with the friend, using the social graph.

Exemplary embodiments of the present invention disclose a system for providing a linked-service, the system including: a processor; a chat service configured to provide a chat service, using the processor, with a friend of a user through a messenger, the friend being registered in the messenger; a messenger operation unit configured to operate the messenger in a messenger-linked service; an target selection unit configured to select at least one target among the friend and a group, the group being registered in the messenger; and a data sharing unit configured to share data associated with the messenger-linked service with the selected target.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 10 illustrates a messenger-linked service method according to exemplary embodiments.

DETAILED DESCRIPTION OF THE ILLUSTRATED EMBODIMENTS

Figure 1:
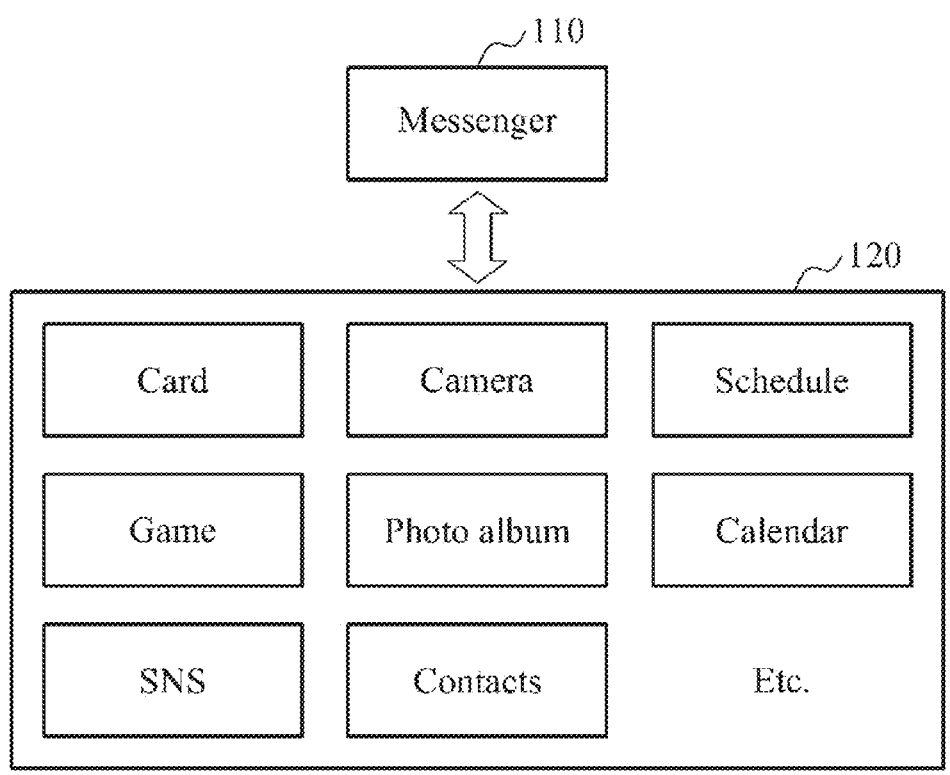
FIG. 1 illustrates a messenger and a messenger-linked application according to exemplary embodiments.

Exemplary embodiments of the present invention will be described in detail with reference to the accompanying drawings. These exemplary embodiments will be described in detail for those skilled in the art in order to practice the present invention. It should be appreciated that various exemplary embodiments of the present invention are different but do not have to be exclusive. For example, specific shapes, configurations, and characteristics described in an exemplary embodiment of the present invention may be implemented in another exemplary embodiment without departing from the spirit and the scope of the present invention. In addition, it should be understood that position and arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof.

Hereinafter, exemplary embodiments of the present invention are described in detail with reference to the accompanying drawings.

It will be understood that when an element is referred to as being "connected to" another element, it can be directly connected to the other element, or intervening elements may be present.

A messenger-linked service system and method may enable data of a messenger-linked application to be transmitted to or shared with a friend or a group in a messenger, using a social graph of a messenger platform installed on a smart device.

FIG. 1 illustrates a messenger 110 and a messenger-linked application 120 according to exemplary embodiments. As shown in FIG. 1, the messenger-linked application 120 may include, for example, a card application, a camera application, a schedule application, a game application, a photo album application, a calendar application, a social Network Service (SNS) application, a contact application, and the like. Data associated with each application or each application itself may be either transmitted or requested to be shared.

For example, messenger 110 can be used as follows. The card application may be used to send a card to a messenger friend. The camera application may be used to transmit and share photos captured by the camera application or stored photos. A user may transmit, share, or request a schedule stored in the schedule application. The game application may be recommended to a messenger friend, or a request to join a game may be sent to the message friend. A photo album stored in the photo album application may be shared. The calendar application may be used to transmit an important anniversary or a schedule of a user. The SNS application may be used to register a messenger friend as an SNS friend, or to share data. Contact information and personal information stored in the contact application may be transmitted, or a transmission request may be sent to a messenger friend. In other words, a messenger-linked service may enable a large amount of data to be transmitted and shared through the messenger 110.

A social graph illustrates interconnections among people, groups and organizations in a social network. The term refers to both the social network itself and a diagram representing the network. Individuals and organizations, called actors or friends, are nodes on the graph. Interdependencies, called ties or relationships, can be multiple and diverse, including such characteristics or concepts as age, gender, race, genealogy, chain of command, ideas, financial transactions, trade relationships, political affiliations, club memberships, occupation, education, economic status, human relationships, friend relationships and social relationships. A social graph of a particular user consists of the set of nodes and ties connected, directly or indirectly, to that actor.

Figure 2:
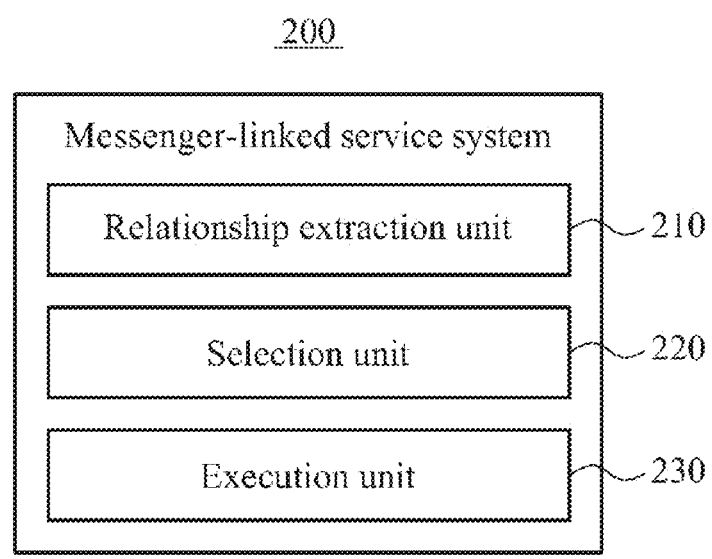
FIG. 2 illustrates a messenger-linked service system according to exemplary embodiments.

FIG. 2 illustrates a messenger-linked service system 200 according to exemplary embodiments. The messenger-linked service system 200 may use a social graph based on a human relationship of a messenger platform, and may perform user authentication between a messenger and a messenger-linked application.

The messenger-linked service system 200 of FIG. 2 may include a relationship extraction unit 210, a selection unit 220, and an execution unit 230. The relationship extraction unit 210 may extract a social graph between a user of a messenger and a friend. The selection unit 220 may select data that is either transmitted to or shared with the friend in the messenger-linked application. The execution unit 230 may transmit the selected data to the friend, or may execute a sharing request.

The user authentication in the messenger-linked service system 200 may be automatically processed by obtaining a user's consent. The user consent may be obtained when user authentication is completed in the messenger. A messenger-linked service system may service a user's consent.

The relationship extraction unit 210 may extract a social graph of a friend relationship, and a social graph of a group relationship, a chat history of the group relationship and a chat history of the friend relationship. Accordingly, a potential target to which the user transmits data or sends a sharing request may be a group, a friend, or a chat room, without any limitation to a friend list of the user.

The selection unit 220 may select the messenger-linked application, or data associated with the messenger-linked application. The data associated with the messenger-linked application may be transmitted to a friend or shared with the friend. The data associated with the messenger-linked application may be extracted from data stored in the messenger-linked application, or may be written as new data associated with the messenger-linked application. The selected data or the selected messenger-linked application may be transmitted to a target extracted by the relationship extraction unit 210, or may be requested to be shared.

The execution unit 230 may be linked to a messenger-linked service and may be invoked during execution of the messenger-linked application. The execution unit 230 may call a social graph or a chat history of each of a friend relationship and a group relationship. The execution unit 230 may select a friend, a group or a chat history to which data is to be transmitted or shared, and transmit data or execute a sharing request. In this instance, there is no limitation to a number of selected targets or a type of targets.

The messenger-linked service system 200 may transfer information regarding data transmission and execution of the sharing request through a push alert, a notification alert, or a chat message based on a setting of the user.

Figure 3:
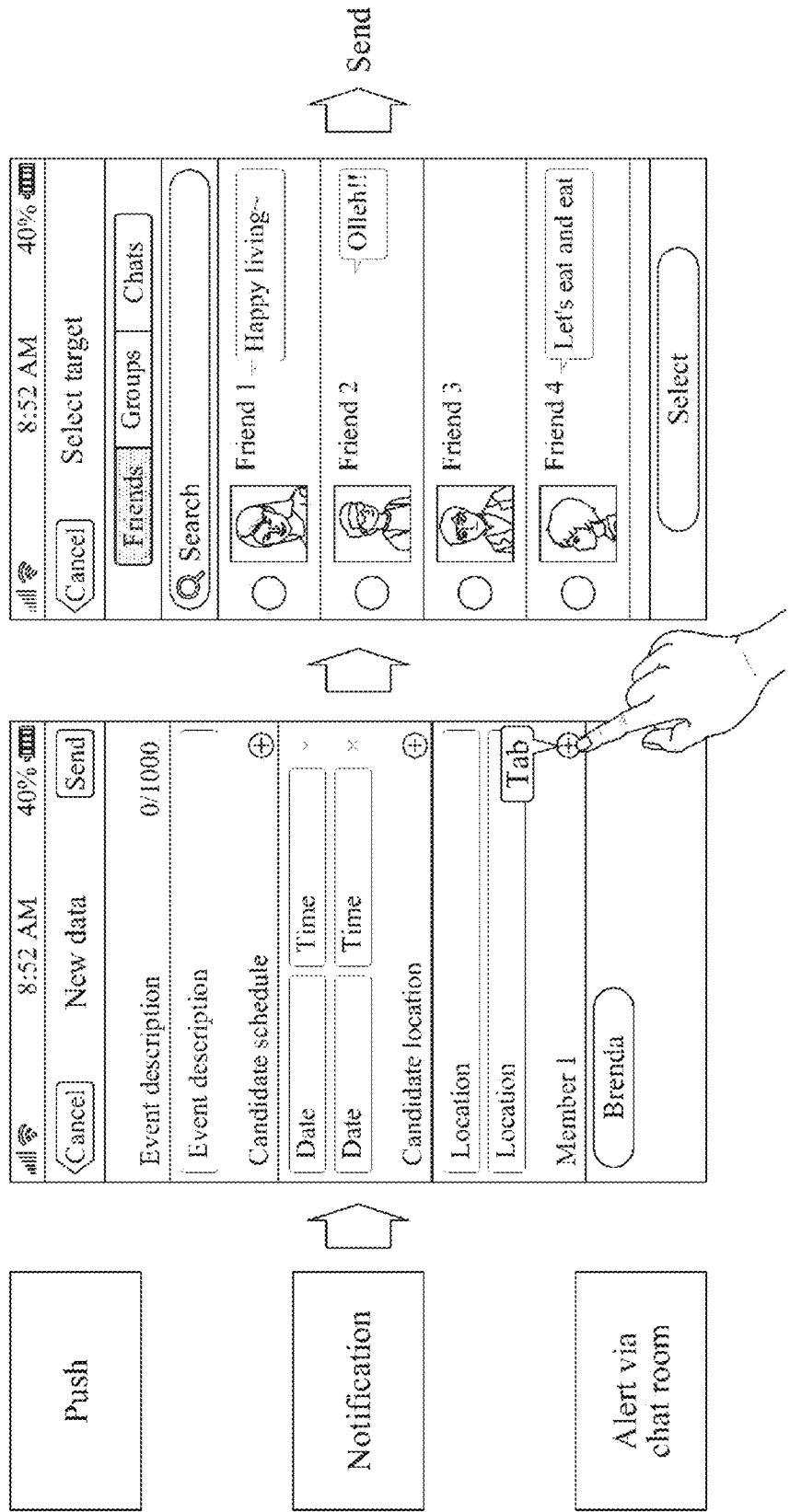
FIG. 3 illustrates a sender executing a messenger-linked service according to exemplary embodiments.
Figure 4:
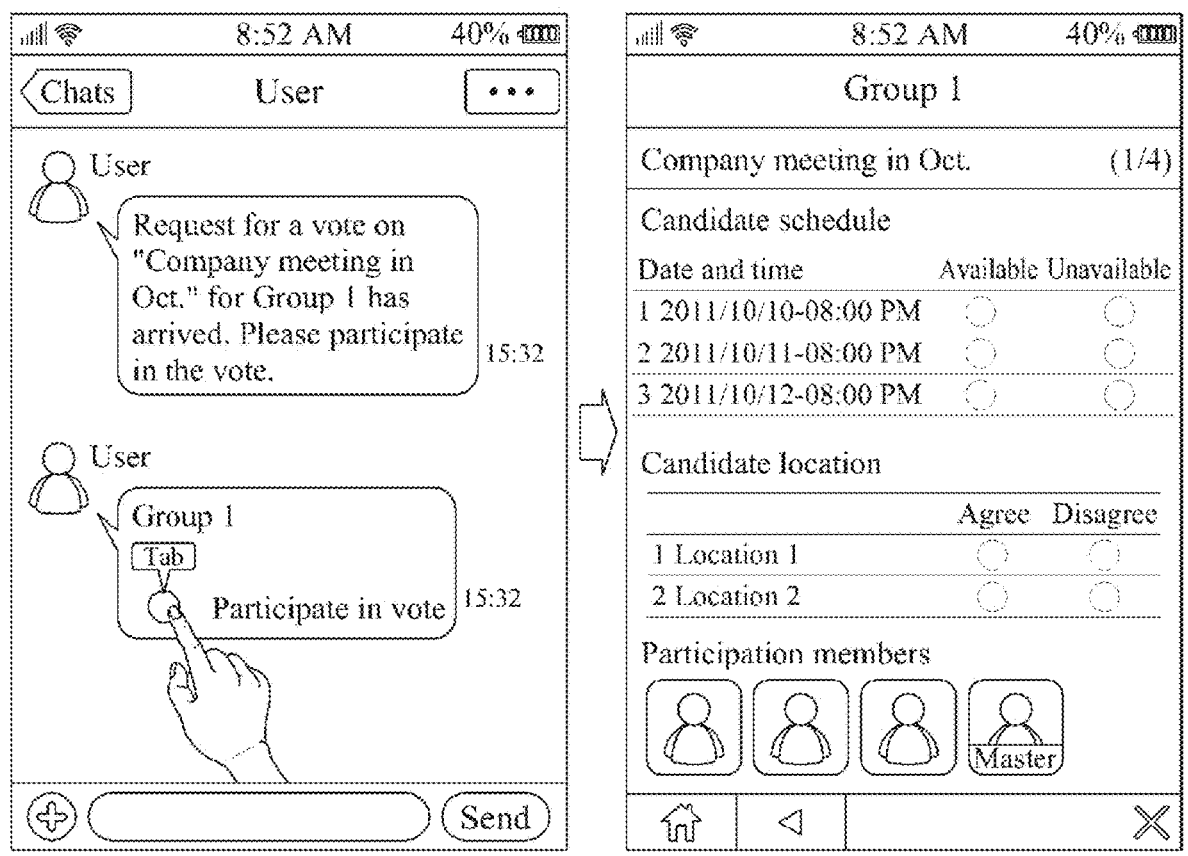
FIG. 4 illustrates a receiver executing a messenger-linked service according to exemplary embodiments.
Figure 5:
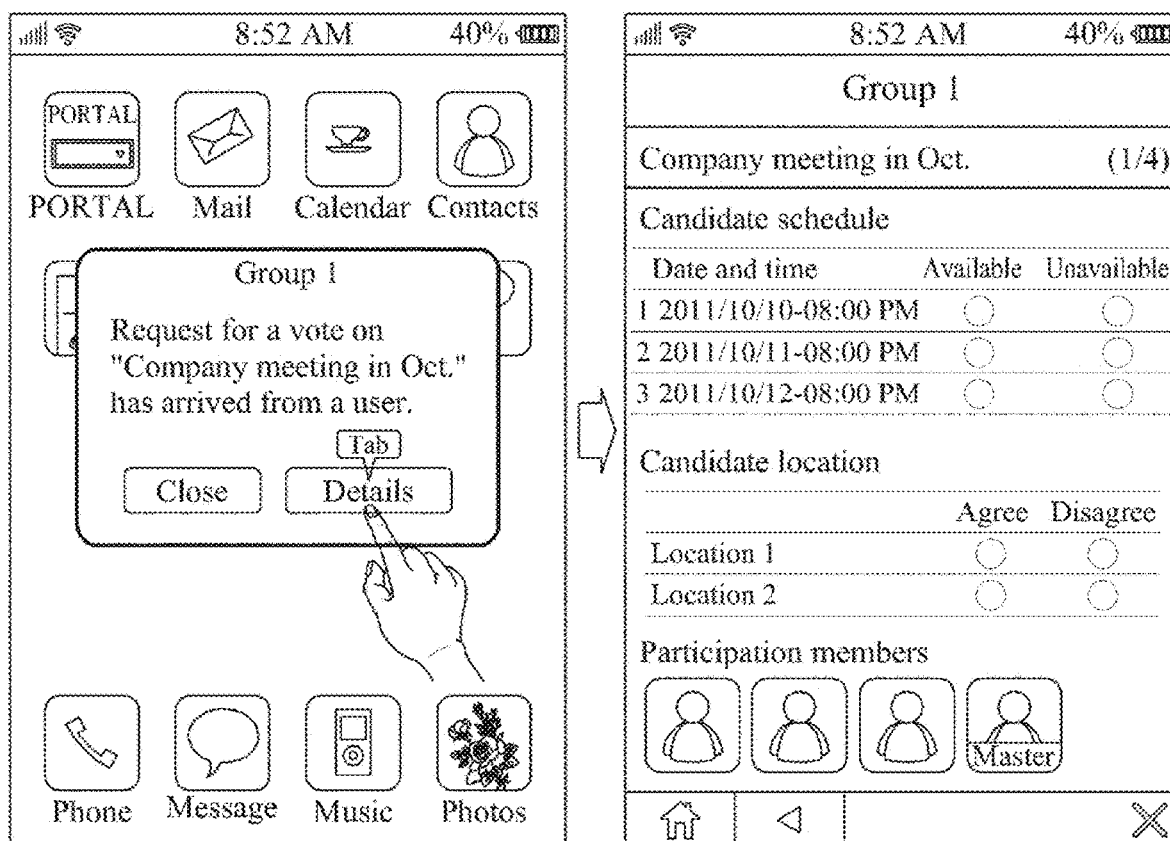
FIG. 5 illustrates a receiver executing a messenger-linked service according to exemplary embodiments.

Examples of use of a messenger-linked service will be described with reference to FIGS. 3 through 5. FIG. 3 illustrates a sender transmitting data using a messenger-linked service. FIGS. 4 and 5 illustrate a receiver receiving data from a sender. In accordance with an illustrative example, the term "sender" may be used interchangeably with a "user."

The sender may determine how the receiver receives an alert. The sender may select an alert from among a push alert, a notification alert, or an alert via a chat room, and may enable the receiver to receive the selected alert.

Referring to FIG. 3, a user may write new data and transmit the new data using a messenger schedule application. The new data may be used to vote for or against available schedules and locations of an event that the user desires to share. For example, as shown in FIG. 3, when the user taps on a screen to add a member to whom a sharing request is to be sent a next screen may appear. A friend list of FIG. 3 may be a friend list of friends based on a messenger platform, and a target may be selected from among a friend tab, a group tab and a chat tab. For example, a list of groups or meetings to which the sender belongs may be selected from the group tab; and either a chat room shared between or in common with the sender and a friend or a chat room of each group may be selected from the chat tab. However, there is no limitation to the selected target and a number of selected targets. When selection of the target is completed, data or a sharing request may be automatically transmitted to the receiver. In another exemplary embodiment, data or a sharing request may be transmitted to the receiver after selection of the target is completed and confirmation to transmit is received.

In FIGS. 3 and 5, a schedule for "Company meeting in October" may be requested to be shared, and a vote on the schedule may be performed. Additionally, "Group 1" may be used as a target for the vote.

When the sender transmits a request, a system may perform an alert that is selected in advance by the sender, so that a receiver may instantly verify the request. As shown in FIGS. 4 and 5, the receiver may receive data from the sender of FIG. 3 and check the received data, and the sender may send a request to share a vote on a schedule and location of "Company meeting in October." In an example, when the sender selects, in advance, the alert via the chat room, the receiver may: check information sent by the user via a chat room of a messenger, tap information received via the chat room, and participate in the vote, as illustrated in FIG. 4.

In another example, when the sender selects the push alert or the notification alert of FIG. 3 and sends the request, an alert window may appear on top of an idle screen of the receiver, as shown in FIG. 5. Additionally, when a button "details" of FIG. 5 is tapped, the receiver may check information sent by the user and may participate in the vote.

According to exemplary embodiments, a messenger-linked service system may use a social graph based on a human relationship of a messenger platform. The messenger-linked service system may be operated by executing a messenger-linked application. The messenger-linked service system may include a selection unit, a relationship extraction unit, and an execution unit. The selection unit may select data that is to be transmitted to a friend or shared with the friend in the messenger-linked application. The relationship extraction unit may extract a social graph between a user of a messenger and the friend. The execution unit may transmit the selected data to the friend, or may execute a sharing request.

A messenger-linked service system may perform a messenger-linked service using a method in which user authentication is not performed.

The messenger-linked service system may be performed by linking a human relationship of a messenger platform to a messenger-linked application. When a messenger is operated, a social graph or a chat history of each of a friend relationship and a group relationship may be automatically called. In some embodiments, the term automatically can be defined as "without data entry by a user." An alert via a chat room may be selected and transmitted to a chat room of the messenger. A push alert or a notification alert may be selected. A chat history or a target to be shared may be selected. Selected data may be transmitted or a sharing request may be executed.

Examples associated with the messenger-linked service system will be described with reference to FIGS. 6 through 8. As described above, a messenger-linked service may be performed by executing the messenger-linked application.

Figure 6:
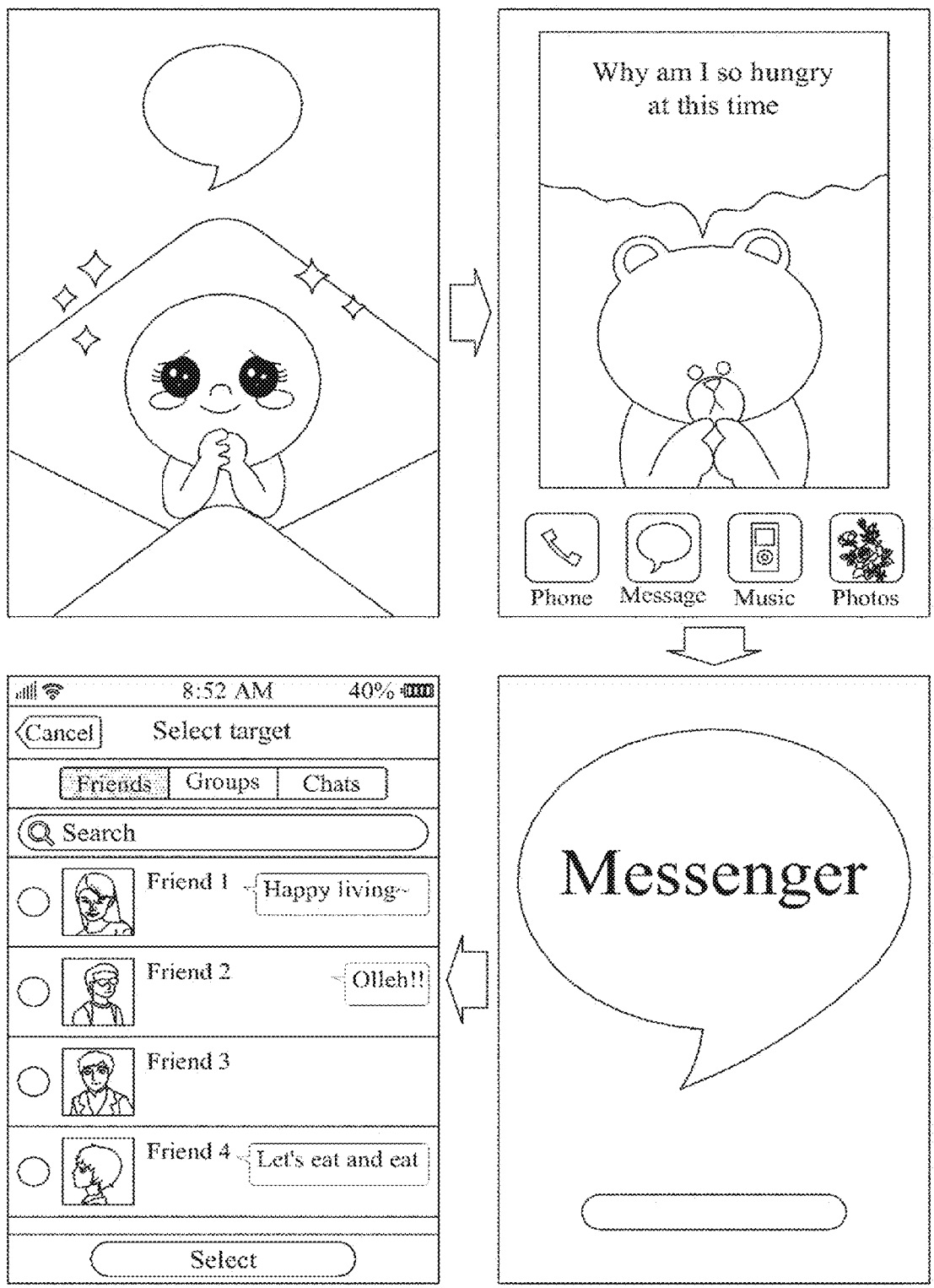
FIG. 6 illustrates a sender executing a messenger-linked service according to exemplary embodiments.

FIG. 6 illustrates a screen of a sender using a messenger-linked service with a card application. The messenger-linked service may be performed by executing a messenger-linked application. The sender writes a card by executing the card application, and may determine a receiver of the card using the messenger-linked service. The sender may operate a messenger without user authentication, and may automatically call a social graph or a chat history of each of a group relationship and a friend relationship. In some embodiments, the term automatically can be defined as "without data entry by a user." Similar to the example of FIG. 3, a target may be selected from among a friend tab, a group tab, and a chat tab. For example, a list of groups or meetings to which the sender belongs may be selected from the group tab, and a chat room between the sender and a friend, or a chat room of each group may be selected from the chat tab.

Figure 7:
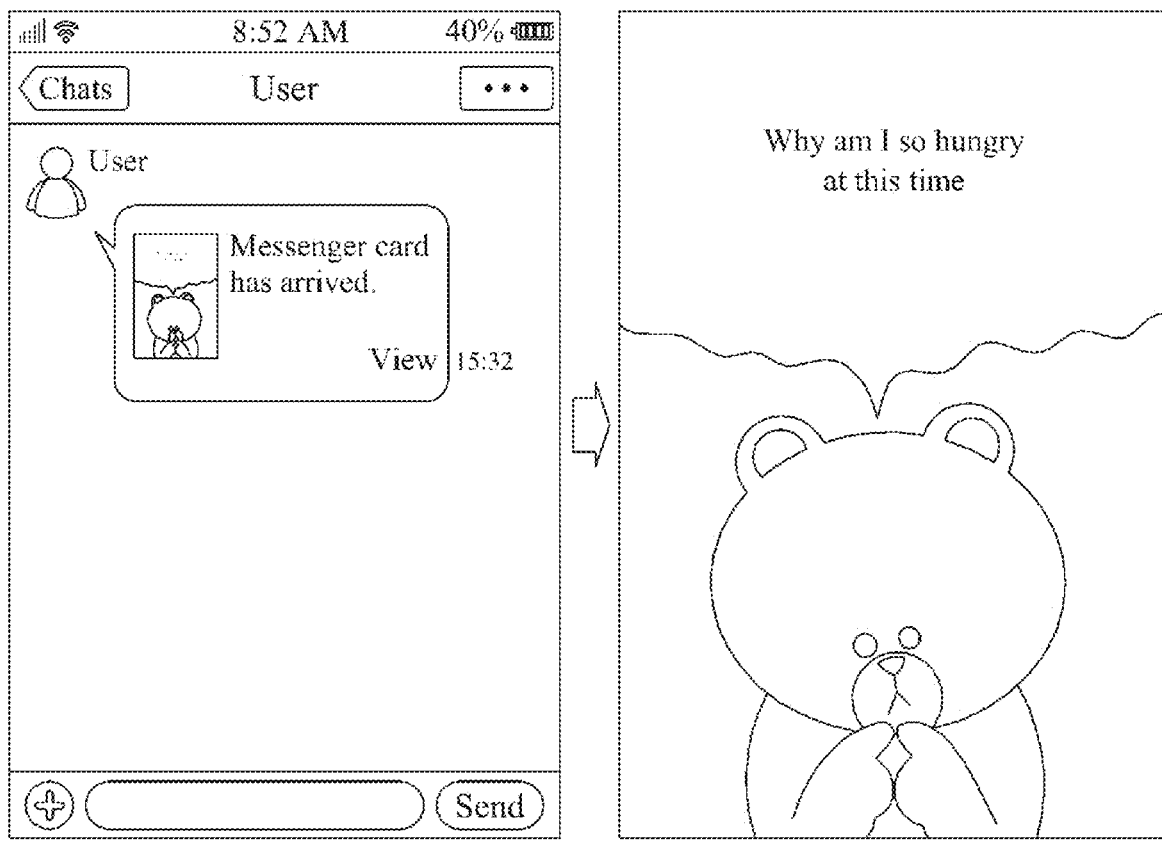
FIG. 7 illustrates a receiver executing a messenger-linked service according to exemplary embodiments.
Figure 8:
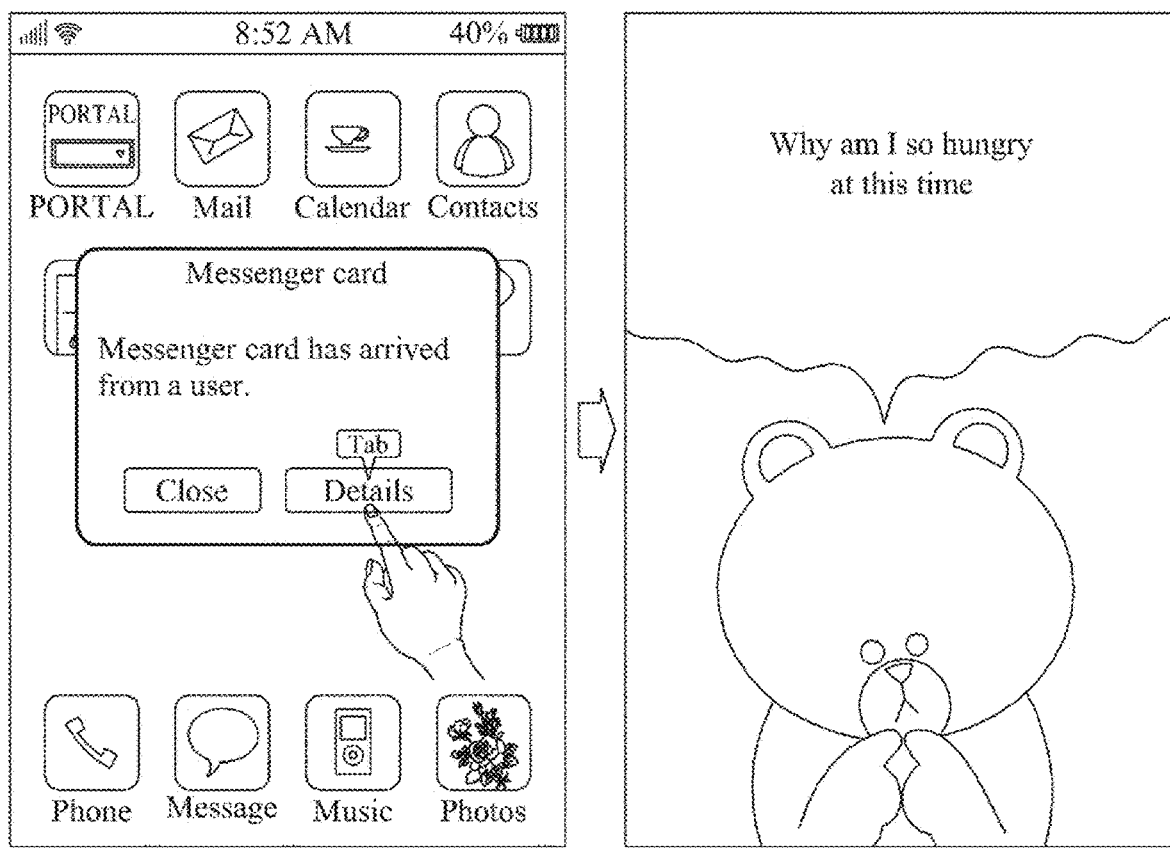
FIG. 8 illustrates a receiver executing a messenger-linked service according to exemplary embodiments.

FIGS. 7 and 8 illustrate a receiver checking a card received from a sender via a messenger-linked service. When the messenger-linked service is performed, information regarding data transmission and execution of a sharing request may be transferred through a push alert, a notification alert, or a chat message based on a setting of the sender. When a written card is transferred to the receiver through a chat message, a card alert may be displayed as a chat window on a chat room of a messenger, as shown in FIG. 7, so that the receiver may check the card. In another example, as shown in FIG. 8, when the card is transferred from the sender to the receiver through the push alert and the notification alert, an alert window may appear on a top of an idle screen of the receiver. In this example, the receiver may tap on "details" of the alert window, and may check the card without a need to execute a messenger.

Figure 9:
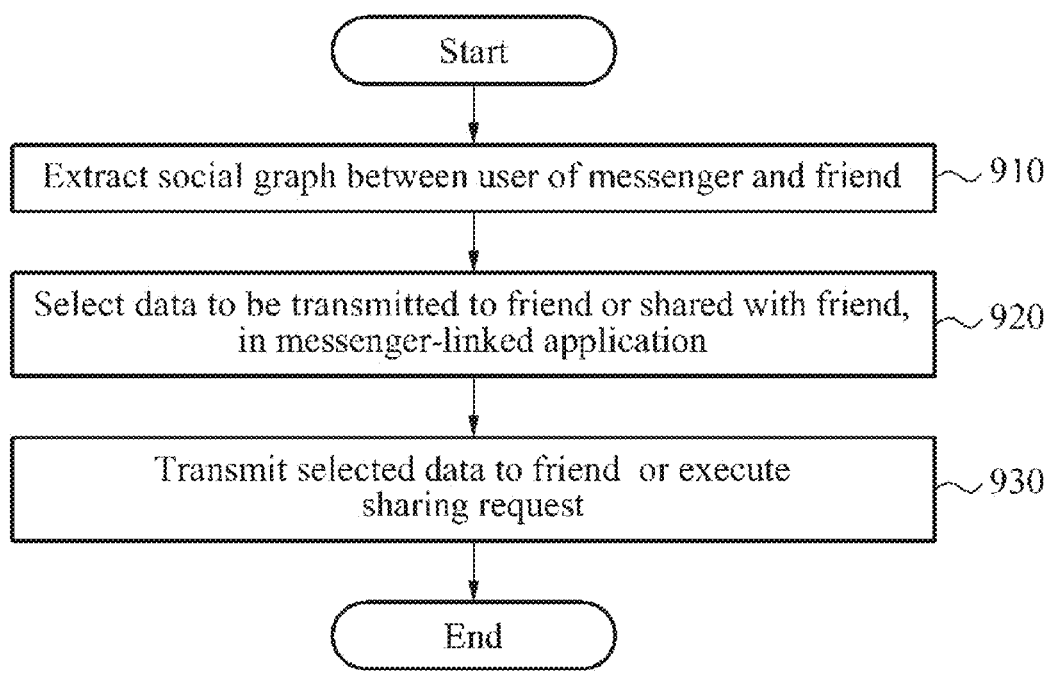
FIG. 9 illustrates a messenger-linked service method according to exemplary embodiments.

FIG. 9 illustrates a messenger-linked service method according to exemplary embodiments. The messenger-linked service method may use a social graph based on a human relationship of a messenger platform. The method may be performed by performing user authentication between a messenger and a messenger-linked application. Operations of the messenger-linked service method of FIG. 9 may be performed based on the messenger-linked service system 200 of FIG. 2.

The messenger-linked service system 200 may perform a step 910 of extracting a social graph between a user of a messenger and a friend, a step 920 of selecting data that is to be transmitted to the friend or shared with the friend in the messenger-linked application, and a step 930 of transmitting the selected data to the friend or executing a sharing request.

In the messenger-linked service method of FIG. 9, the user authentication may be automatically processed by obtaining a user's consent when the messenger-linked application is used. The messenger-linked service method of FIG. 9 may be performed with respect to an authenticated user.

In step 910, the messenger-linked service system 200 may extract a social graph of a group relationship of the messenger, a social graph of a friend relationship of the messenger, a chat history of the group relationship and a chat history of the friend relationship. The extracted social graphs and chat histories may be transmitted, and requested to be shared.

In step 920, the messenger-linked service system 200 may select the messenger-linked application or data associated with the messenger-linked application. The data associated with the messenger-linked application may be transmitted to a friend or shared with the friend. The data associated with the messenger-linked application may either be extracted from data stored in the messenger-linked application or may be written as new data associated with the messenger-linked application. For example, in step 920 a camera, a schedule, a game, a photo album, a calendar, an SNS, or contacts may be selected. In some embodiments, data associated with a messenger-linked application, such as, a card application, a camera application, a schedule application, a game application, a photo album application, a calendar application, an SNS application, or a contact application, may be selected.

In step 930, the messenger-linked service system 200 may be linked to a messenger-linked service and executed within the messenger-linked application. Additionally, a social graph or a chat history of each of a friend relationship and a group relationship may be called from the messenger-linked application, a friend or a group to which data is to be transmitted or shared, or a chat history may be selected, and the data selected in step 920 may be transmitted or the sharing request may be executed.

In the messenger-linked service method of FIG. 9, the selected data may be transferred through a push alert, a notification alert, or a chat message, based on a setting of the user.

FIG. 10 illustrates a messenger-linked service method according to exemplary embodiments. The messenger-linked service method of FIG. 10 may be provided to a user who does not pass through user authentication. Operations of the messenger-linked service method of FIG. 10 may be performed based on the messenger-linked service system 200 of FIG. 2.

The messenger-linked service method of FIG. 10 may be performed by executing a messenger-linked application, and may use a social graph based on a human relationship of a messenger platform. The messenger-linked service method of FIG. 10 may include a step 1010 of selecting data that is to be transmitted to a friend or shared with the friend in the messenger-linked application, a step 1020 of extracting a social graph between a user of a messenger and the friend, and a step 1030 of transmitting the selected data to the friend or executing a sharing request.

In step 1020, the human relationship of the messenger platform may be linked to the messenger-linked application, and may be extracted.

When the messenger is operated, a social graph or a chat history of each of a friend relationship and a group relationship may be automatically called, and a target including a chat history may be selected for transmission or sharing through the messenger. Subsequently, the selected data may be transmitted or the sharing request may be executed. The messenger may use the messenger-linked service and may be executed to call a target to which data is to be transmitted, or a target to which a sharing request is to be sent.

According to embodiments of the present invention, data of an application linked to a messenger may be transmitted or shared through a friend, a group, or a chat room in the messenger, and thus it is possible to provide a more convenient linked service, and to diversify a type of the data.

According to embodiments of the present invention, it is possible to link a messenger to a messenger-linked application, without a need to individually recommend friends or groups in the messenger and to solve conventional inconveniences.

A computer system may be used as a computer-readable medium that includes an instruction to control a messenger-linked service method using a social graph based on a human relationship of a messenger platform to be performed by performing user authentication between a messenger and a messenger-linked application. The instruction may be recorded in a computer-readable medium to control the computer system, by the messenger-linked service method that includes extracting a social graph between a user of the messenger and a friend, selecting data that is to be transmitted to the friend or shared with the friend in the messenger-linked application, and transmitting the selected data to the friend or executing a sharing request.

Additionally, a computer system may be used as a computer-readable medium that includes an instruction to control a messenger-linked service method using a social graph based on a human relationship of a messenger platform to be performed by executing a messenger-linked application. The instruction may be recorded in a computer-readable medium to control the computer system, by the messenger-linked service method that includes selecting data that is to be transmitted to a friend or shared with the friend in the messenger-linked application, extracting a social graph between a user of a messenger and the friend, and transmitting the selected data to the friend or executing a sharing request.

The media may also include, alone or in combination with the program instructions, data files, data structures, and the like. The media and program instructions may be those specially designed and constructed for the purposes of the present invention, or they may be of the kind well-known and available to those having skill in the computer software arts.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A non-transitory computer-readable medium including computer executable instructions that, when executed by at least one processor included in a smart device of a sending user, causes the smart device to:
   generate, using a messenger application installed in the smart device of the sending user, a messenger graphical user interface (GUI), the messenger application associated with at least one messenger service;
   extract, using the messenger application installed in the smart device of the sending user and associated with the at least one messaging service, at least one of a first social graph of a friend relationship of the sending user, a second social graph of a group relationship of the sending user, a chat history of the group relationship, or a chat history of the friend relationship, to provide one or more potential targets;
   receive a message input from the sending user on the messenger GUI, the message input including a message and a selection of a message alert type associated with the message from a plurality of message alert types;
   receive a selection input from the sending user on the messenger GUI, the selection input including a selection of at least one target for the message from among the one or more potential targets; and
   transmit the message to the at least one target based on the selected message alert type.

2. The non-transitory computer-readable medium of claim 1, wherein the plurality of message alert types includes a push alert type, a notification alert type, an alert via chat alert type, or any combinations thereof.

3. The non-transitory computer-readable medium of claim 1, wherein the smart device is further caused to:
   receive the selection input from the sending user on a target selection GUI included in the messenger GUI, the target selection GUI including a display of at least one of a list of friends of the sending user on the at least one messenger service, a list of groups the sending user is associated with on the at least one messenger service, a list of chat rooms the sending user is associated with on the at least one messenger service, or any combinations thereof.

4. The non-transitory computer-readable medium of claim 1, wherein the smart device is further caused to:
   link the messenger application with at least one secondary application, the at least one secondary application including at least one of a card application, a camera application, a schedule application, a game application, a photo album application, a calendar application, a contact application, or any combinations thereof; and
   extract data associated with the sending user from the linked secondary application.

5. The non-transitory computer-readable medium of claim 4, wherein the smart device is further caused to:
   transmit the extracted data to the at least one target using the messenger application.

6. The non-transitory computer-readable medium of claim 4, wherein
   the linked secondary application is the schedule application;
   the extracted data is scheduling data associated with the sending user; and
   the smart device is further caused to, receive a vote request input from the sending user on the messenger GUI, transmit the message to the at least one target based on the selected message alert type, the extracted data, and the vote request input using the messenger application.

7. The non-transitory computer-readable medium of claim 6, wherein the transmitting the message to the at least one target causes the smart device associated with the at least one target to:

display an alert to the at least one target corresponding to the selected message alert type;

display the message to the at least one target; and display a voting GUI based on the extracted data.

8. The non-transitory computer-readable medium of claim 4, wherein the linked secondary application is the card application;

the extracted data is card data generated by the sending user using the card application; and the smart device is further caused to, transmit the message to the at least one target based on the selected message alert type and the extracted data.

9. A method related to a messenger linked service, the method comprising:

generating, using a messenger application installed in a smart device of a sending user, a messenger graphical user interface (GUI), the messenger application associated with at least one messenger service;

extract, using the messenger application installed in the smart device of the sending user and associated with the at least one messaging service, at least one of a first social graph of a friend relationship of the sending user, a second social graph of a group relationship of the sending user, a chat history of the group relationship, or a chat history of the friend relationship, to provide one or more potential targets;

receiving a message input from the sending user on the messenger GUI, the message input including a message and a selection of a message alert type associated with the message from a plurality of message alert types;

receiving a selection input from the sending user on the messenger GUI, the selection input including a selection of at least one target for the message from among the one or more potential targets; and transmitting the message to the at least one target based on the selected message alert type.

10. The method of claim 9, wherein the plurality of message alert types includes a push alert type, a notification alert type, an alert via chat alert type, or any combinations thereof.

11. The method of claim 9, the method further comprising:

receiving the selection input from the sending user on a target selection GUI included in the messenger GUI, the target selection GUI including a display of at least one of a list of friends of the sending user on the at least one messenger service, a list of groups the sending user is associated with on the at least one messenger service, a list of chat rooms the sending user is associated with on the at least one messenger service, or any combinations thereof.

12. The method of claim 9, further comprising:

linking the messenger application with at least one secondary application, the at least one secondary application including at least one of a card application, a camera application, a schedule application, a game application, a photo album application, a calendar application, a contact application, or any combinations thereof; and extracting data associated with the sending user from the linked secondary application.

13. The method of claim 12, further comprising:

transmitting the extracted data to the at least one target using the messenger application.

14. The method of claim 12, wherein the linked secondary application is the schedule application;

the extracted data is scheduling data associated with the sending user; and the method further includes, receiving a vote request input from the sending user on the messenger GUI, transmitting the message to the at least one target based on the selected message alert type, the extracted data, and the vote request input.

15. The method of claim 14, wherein the transmitting the message to the at least one target causes the smart device associated with the at least one target to:

display a voting GUI based on the extracted data.

16. The method of claim 12, wherein the linked secondary application is the card application;

the extracted data is card data generated by the sending user using the card application; and the method further includes, transmitting the message to the at least one target based on the selected message alert type and the extracted data.

17. A smart device of a sending user, comprising:

a memory storing computer readable instructions; and at least one processor configured to execute the computer readable instructions to cause the smart device to, generate, using a messenger application installed in the smart device of the sending user, a messenger graphical user interface (GUI), the messenger application associated with at least one messenger service;

extract, using the messenger application installed in the smart device of the sending user and associated with the at least one messaging service, at least one of a first social graph of a friend relationship of the sending user, a second social graph of a group relationship of the sending user, a chat history of the group relationship, or a chat history of the friend relationship, to provide one or more potential targets;

receive a message input from the sending user on the messenger GUI, the message input including a message and a selection of a message alert type associated with the message from a plurality of message alert types;

receive a selection input from the sending user on the messenger GUI, the selection input including a selection of at least one target for the message from among the one or more potential targets; and transmit the message to the at least one target based on the selected message alert type.

18. The smart device of claim 17, wherein the plurality of message alert types includes a push alert type, a notification alert type, an alert via chat alert type, or any combinations thereof.

19. The smart device of claim 17, wherein the smart device is further caused to:

receive the selection input from the sending user on a target selection GUI included in the messenger GUI, the target selection GUI including a display of at least one of a list of friends of the sending user on the at least one messenger service, a list of groups the sending user is associated with on the at least one messenger service, a list of chat rooms the sending user is associated with on the at least one messenger service, or any combinations thereof.

20. The smart device of claim 18, wherein the smart device is further caused to:
- link the messenger application with at least one secondary application, the at least one secondary application including at least one of a card application, a camera application, a schedule application, a game application, a photo album application, a calendar application, a contact application, or any combinations thereof; and
- extract data associated with the sending user from the linked secondary application.

* * * * *